United States Patent
Shroff et al.

(10) Patent No.: US 10,626,015 B2
(45) Date of Patent: Apr. 21, 2020

(54) PROCESS FOR PREPARATION OF HYDROBROMIC ACID

(71) Applicant: Agrocel Industries Limited, Bhuj, Gujarat (IN)

(72) Inventors: Dipesh Kantisen Shroff, Mumbai (IN); Bhupendra Kalyanbhai Sachani, Bhuj (IN); Dhaval Rajnikant Dave, Bhuj (IN)

(73) Assignee: Agrocel Industries Limited, Bhuj, Gujarat (IN)

( * ) Notice: Subject to any disclaimer, the term of this patent is extended or adjusted under 35 U.S.C. 154(b) by 165 days.

(21) Appl. No.: 15/551,880

(22) PCT Filed: Jan. 8, 2016

(86) PCT No.: PCT/IN2016/000011
§ 371 (c)(1),
(2) Date: Aug. 17, 2017

(87) PCT Pub. No.: WO2016/132376
PCT Pub. Date: Aug. 25, 2016

(65) Prior Publication Data
US 2019/0119111 A1    Apr. 25, 2019

(30) Foreign Application Priority Data

Feb. 19, 2015    (IN) .......................... 536/MUM/2015

(51) Int. Cl.
*C01B 7/09*       (2006.01)
*C01B 17/775*     (2006.01)
(Continued)

(52) U.S. Cl.
CPC ............... *C01B 7/093* (2013.01); *B01D 3/36* (2013.01); *B01D 5/0063* (2013.01);
(Continued)

(58) Field of Classification Search
CPC ...... B01D 3/36; B01D 5/0063; C01B 17/775; C01B 17/90; C01B 7/093
See application file for complete search history.

(56) References Cited

U.S. PATENT DOCUMENTS 6,093,306 A * 7/2000 Hanrahan ............... C01B 7/093
                                                    205/619
8,815,050 B2   8/2014 Kurukchi et al.
(Continued)

FOREIGN PATENT DOCUMENTS

CN    101045529    10/2007
CN    103964382    8/2014

OTHER PUBLICATIONS

International Search Report issued in International Application No. PCT/IN2016/000011, dated Oct. 18, 2016.
(Continued)

*Primary Examiner* — Ngoc-Yen Nguyen
(74) *Attorney, Agent, or Firm* — Knobbe, Martens, Olson & Bear, LLP

(57) ABSTRACT

A process has been disclosed for preparation of hydrobromic acid from bromine, sulfur dioxide and water, which involves in situ generation of bromine from bittern for the production of hydrobromic acid and separation thereof from co-products, viz., sulfuric and hydrochloric acids. The invented process obviates the need for double distillation or precipitation step for removal of sulfate impurities. The concentration of the product obtained by the disclosed process is about 48% and it contains <15 ppm sulfate and chloride impurities.

8 Claims, 1 Drawing Sheet

(51) Int. Cl.
  *C01B 17/90* (2006.01)
  *C01B 7/07* (2006.01)
  *B01D 3/36* (2006.01)
  *B01D 5/00* (2006.01)

(52) U.S. Cl.
  CPC ............ *C01B 7/0712* (2013.01); *C01B 7/096* (2013.01); *C01B 17/775* (2013.01); *C01B 17/90* (2013.01); *C01P 2006/80* (2013.01)

(56) References Cited

U.S. PATENT DOCUMENTS

| | | | |
|---|---|---|---|
| 9,702,049 B1* | 7/2017 | Parker | C25B 9/10 |
| 2005/0135990 A1 | 6/2005 | Schaefer et al. | |
| 2007/0196255 A1* | 8/2007 | Sherman | B01D 53/507 |
| | | | 423/215.5 |

OTHER PUBLICATIONS

Written Opinion issued in International Application No. PCT/IN2016/000011, dated Oct. 18, 2016.

* cited by examiner

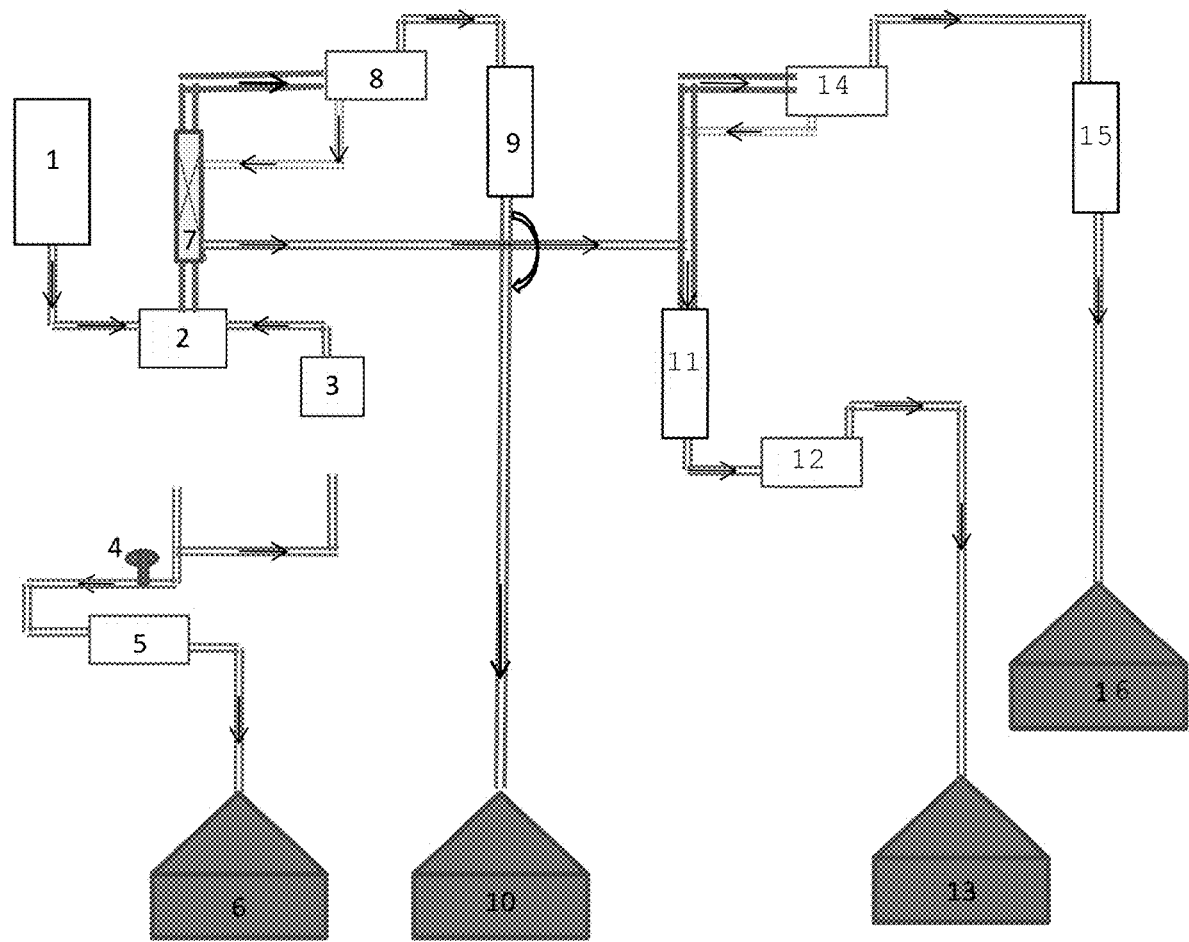

PROCESS FOR PREPARATION OF HYDROBROMIC ACID

This application is the U.S. National Phase under 35 U.S.C. § 371 of International Application No. PCT/IN2016/000011, filed Jan. 8, 2016, designating the U.S., and published in English as WO 2016/132376 A1 on Aug. 25, 2016, which claims priority to Indian Patent Application No. 536/MUM/2015, filed Feb. 19, 2015, the entire contents of which are incorporated herein by reference.

TECHNICAL FIELD

This invention relates to a process for preparation of hydrobromic acid. More particularly, the invention relates to a process for preparation of hydrobromic acid from bromine and sulfur dioxide which involves in situ generation of bromine from bittern for the production of hydrobromic acid, and separation thereof from co-products, viz., sulfuric and hydrochloric acids.

BACKGROUND

HBr forms azeotrope with water. The strength of constant boiling aqueous HBr solution can be maximum up to about 48%. Constant boiling HBr is very useful as a reagent as well as a reactant for synthesis of various chemical intermediates and chemicals, including pharmaceuticals.

High levels of impurities such as sulfate impurities are not acceptable for commercially important applications of HBr and hence purity of the product obtained is an important criteria which the manufacturing process must fulfill.

Conventionally, to obtain aqueous hydrobromic acid of desired strength and purity, double distillation and/or precipitation is carried out for removal of sulfate impurities. Double distillation and/or precipitation adds to and extra step and cost of the process. It also consumes extra energy and increases environmental load.

Hydrobromic acid can be prepared by reaction of bromine with sulfur and water in accordance with the following reaction:

$$3Br_2 + S + 4H_2O \rightarrow H_2SO_4 + 6HBr$$

However, this reaction is slow and the reaction mixture requires to be vigorously stirred. The reaction mass remains cold initially and then there is a sudden rise in temperature causing bromine to evaporate. To overcome this problem, Frieda et al. have developed a process (U.S. Pat. No. 2,342,465) which comprises of two steps: in the first step, sulfur is dissolved in bromine so as to obtain sulfur bromide as follows:

$$Br2 + 2S \rightarrow S_2Br_2$$

$S_2Br_2$ thus formed is then reacted further with bromine and water to produce HBr and $H_2SO_4$ as follows:

$$S_2Br_2 + 5Br_2 + 8H_2O \rightarrow 2H_2SO_4 + 12HBr$$

Hydrobromic acid is recovered by distillation to obtain 42% HBr. Or alternatively sulfuric acid is removed by precipitation with barium carbonate.

CN1126174 discloses a process for preparing hydrobromic acid, said process includes reaction of bromine, sulfur and water at 20-50 deg.C for 1.5-20 hrs, filtering, distillation at 80-110 deg.C and addition of barium hydroxide to remove sulfuric radicals. A method for continuous preparation of hydrobromic acid from bromine and sulfur is reported by Mandalia et al., *Indian J. Technol.*, 1973, 11(9), 406.

USSR 472895 also discloses a method of preparation of HBr from Br2, sulfur and water using $MnO_2$ and $V_2O_5$ as catalysts.

In above mentioned methods for preparing HBr from bromine and sulfur, sulfate impurities are present which needs to be removed either by double distillation or by precipitation which adds to energy consumption and cost as mentioned above.

Preparation of hydrobromic acid from bromine, carbon and water is also reported in the literature (U.S. Pat. No. 1,870,308). In this process, carbon is oxidized to carbon dioxide and bromine is converted into hydrogen bromide which dissolves in excess water. This process requires reactants in high purity because if carbon contains HBr soluble matter, the impurities need to be removed by treatment of carbon before the reaction.

U.S. Pat. No. 1,379,731 discloses a method of manufacturing HBr by direct distillation from a reaction mixture comprising alkali bromide (such as sodium bromide) and mineral acid (sulfuric acid).

A process for conversion of sodium bromide to hydrobromic acid and sodium bisulfate has been reported in the patent application US2004/0067191.

A continuous process for making hydrobromic acid from bromine and hydrogen and dissolution thereof in water to obtain HBr is disclosed in U.S. Pat. No. 1,398,596. GB154472, U.S. Pat. Nos. 1,905,432, 1,380,084 and 2,070,263 also discloses a method for manufacturing hydrobromic acid from bromine and hydrogen. These methods require isolation of bromine and reaction with hydrogen which is hazardous.

RO111839 discloses a method of manufacturing HBr from sodium bromide and concentrated sulfuric acid to produce hydrobromic acid which is then sparged into azeotropous hydrobromic acid, until the desired concentration is obtained. Removal of sulfate impurities is a problem in this method also.

Israeli 39120 discloses a method of producing HBr free of $Br_2$ comprising treating brine such as Dead Sea brine in a reactor containing a fluidized bed of particles maintained in fluidized state by upward passage of gases at 800-1300° C.

Separation of aqueous HBr from an aqueous solutions containing mixture of HBr, HCl and $H_2SO_4$ has been reported in USSR709522. The method comprises fractional distillation followed by condensation of the acid vapor. The method was improved by distilling and condensing at 0.35-0.5 atm., by concentrating the solution during separation of HCl to an HBr content in the vapor of 44-9%, and by distilling during HBr separation to an $H_2SO_4$ concentration in the pot residue of 58-70%.

The abovementioned methods for producing hydrobromic acid reported in the prior art involve energy consuming process. Moreover, sulfate impurities are present in the product which compels one either for double distillation or treatment with precipitating agent such as barium carbonate to get rid of sulfates. Present invention overcomes abovementioned drawbacks of prior art.

Closest prior art JP78149895 (application number JP19770066175) discloses a method for production of hydrogen bromide gas and sulfuric acid from bromine and sulfur dioxide. However, it requires higher temperature and prior-isolation of bromine for carrying out the process. The present invention consumes lesser energy and it also obviates the need for isolation of bromine. In the present invention, bromine is generated in situ from bittern and it is reacted with $SO_2$ without the need for isolation of bromine. Present invention also obviates the need for removal of sulfur by precipitation. The invented process is simple, cost effective and safer compared to the prior art.

SUMMARY

An object of invention is to provide a simple, cost effective and continuous process for producing hydrobromic acid with desired concentration as well as purity.

Another object of invention is to provide a continuous process for producing hydrobromic acid by reaction of bromine with sulfur dioxide, without the need for isolation of bromine i.e., bromine is generated in situ from bittern and used for the reaction.

Another object of invention is to provide a continuous process for producing hydrobromic acid which does not require the step of treatment with precipitating agent such as barium carbonate for removal of sulfate impurities.

Yet another object of invention is to provide a continuous process for producing hydrobromic acid which does not require double distillation of the product.

BRIEF DESCRIPTION OF THE DRAWINGS

FIG. 1 is a schematic diagram showing equipment employed for preparation of hydrobromic acid wherein the numbered components are as under:
1⇒feed tank
2⇒flash tank
3⇒first re-boiler
4⇒valve
5⇒third heat exchanger
6⇒second storage tank
7⇒reflux divider
8⇒main heat exchanger
9⇒first vertical heat exchanger
10⇒third storage tank
11⇒second re-boiler
12⇒second heat exchanger
13⇒first storage tank
14⇒third heat exchanger
15⇒second vertical heat exchanger
16⇒fourth storage tank

DETAILED DESCRIPTION

Bittern contains 800-1000 ppm bromine as magnesium bromide ($MgBr_2$). Upon treatment of acidified bittern (pH=3) with chlorine, oxidation followed by substitution reaction occurs, releasing bromine. Overall reaction is as under:

$$MgBr_2 + Cl_2 \rightarrow MgCl_2 + Br_2$$

Some HCl is also generated during chlorination of bittern.

Bromine thus generated is subjected to air-stripping and then it passes through absorption tower, where it reacts with $SO_2$ and water to form hydrobromic acid and sulfuric acid.

$$Br_2 + SO_2 + 2H_2O \rightarrow H_2SO_4 + 2HBr$$

Strength of HBr obtained at this stage is 25-28% and that of $H_2SO_4$ is 15-20%.

Flash tank (2) and re-boiler (3) are filled with mixture of $HBr + H_2SO_4$ obtained as stated above. It also contains some HCl. The flash tank (2) is made up of polymer material and it is connected via connecting pipes to the re-boiler (3) as shown in FIG. 1. The re-boiler (3) is made up of corrosion resistant material such as graphite. The acid mixture is heated to 95-100° C. by heating re-boiler (3). The system is maintained at a reduced pressure of 670-700 mm Hg and hence the mixture boils at 95-100° C. The mixture boils and starts thermo-siphoning from re-boiler (3) to flash-tank (2) through upper connecting pipe.

Because of the difference in boiling points and specific gravity, $H_2SO_4$ tends to remain at the bottom of the flash tank (2). HBr, HCl and water vapourizes and tends to move towards the upper end of the flash tank (2). The upper end of the flash tank (2) is connected via a hollow glass column to the heat exchanger (8).

Once the mixture starts thermosiphoning, HBr+H2SO4 mixture is added continuously into the flash tank (2) from the feed tank (1). HBr forms azeotropic mixture with water and it goes into heat exchanger (8). HBr condenses in the heat exchanger (8) and it is fed back to the upper part of the hollow glass column as shown in FIG. 1. HCl is low boiling and along with some water vapour it moves from heat exchanger (8) to vertical heat exchanger (9) where it condenses and is collected separately in tank (10).

A reflux divider (7) is provided at the centre of the hollow glass column mentioned above. HBr which is fed back to the upper part of the hollow glass column falls on the lower part of the reflux divider. At this stage, the concentration of HBr is 41-45% and it still contains 500-800 ppm HCl. Hence it needs to be purified and concentrated further.

Lower part of the reflux divider is at a comparatively higher temperature than the upper part. Due to this, when 41-45% HBr (containing 500-800 ppm HCl) falls on the lower part of the reflux divider, HCl and water remaining therein further evaporates from it and enters into the heat exchanger (8). Thus HBr gets further purified and concentrated.

A connecting pipe is provided at the lower end of the reflux divider (7) which extends up to a glass column above the re-boiler (11). HBr flows from the bottom of the reflux divider (7) to re-boiler (11) via this connecting pipe.

As the temperature of re-boiler (11) is maintained at 65-70° C., traces of HCl and water vapour present in HBr evaporates and goes into the heat exchanger (14) along with some HBr-mist. HBr-mist condenses in the heat exchanger (14) and flows back to re-boiler (11). HCl and water vapour goes from upper end of heat exchanger (14) to vertical heat exchanger (15) where it condenses and it is collected in the storage tank 16.

Because of high specific gravity, HBr collects at the bottom of the re-boiler (11), from where it flows through the heat exchanger (12) and ultimately flows to the storage tank (13). The concentration of HBr collected in the storage tank (13) is about 48%. It contains <15 ppm sulfate and <15 ppm chloride.

$H_2SO_4$ is collected from the bottom of the flash-tank (2) by opening the valve (4). Collection is started when specific gravity of $H_2SO_4$ is at least 1.45, preferably at least 1.5. Rate of drain-out of $H_2SO_4$ is adjusted in proportion with the rate of addition of the $HBr + H_2SO_4$ mixture in the flash-tank (2).

EXAMPLE-1

As per an embodiment of the invention, bittern containing about 1000 ppm bromine as magnesium bromide ($MgBr_2$) was acidified with sulfuric acid to pH 3. Acidified bittern was sprayed from the top of a stripping tower. Chlorine gas (3-4% in excess to stoichiometric amount of bromine content of the bittern) and air were injected from the bottom of the stripping tower. It generated bromine as per the following reaction:

$$MgBr_2 + Cl_2 \rightarrow MgCl_2 + Br_2$$

Bromine thus generated was fed from the bottom of an absorption tower in which $SO_2$ (about 5% in excess to stoichiometric amount) and water were introduced from the top. Bromine reacted with SO2 and water to obtain HBr (28%) and $H_2SO_4$ (20%).

HBr+$H_2SO_4$ mixture obtained as above was filled in flash tank (2) and re-boiler (3). It was heated to 95° C. by heating re-boiler. The system was maintained at about 670 mm Hg. After the mixture started boiling and thermo-siphoning, gradual addition of HBr+$H_2SO_4$ mixture into the flash tank was started.

$H_2SO_4$ formed was collected from the bottom of the flash tank (2) by opening the valve (4). Collection was started when specific gravity of $H_2SO_4$ was 1.51. Rate of drain-out of $H_2SO_4$ was adjusted in proportion with the rate of addition of the HBr+$H_2SO_4$ mixture in the flash-tank (2).

HBr formed azeotropic mixture with water and was condensed in heat exchanger (8). It was fed back to the upper part of the hollow glass column in which a reflux divider (7) was fitted. HBr was then allowed to flow from the bottom of the reflux divider (7) to re-boiler (11) via a connecting pipe. Temperature of the re-boiler (11) was maintained at 65-70° C. HBr collecting at the bottom of the re-boiler (11) was allowed to flow via heat exchanger (12) to the storage tank (13). Concentration of HBr collected in the storage tank (13) was about 48% and it contained <15 ppm chloride and sulfate impurities. Incidentally produced HCl and water were removed from the mixture containing hydrobromic acid, HCl and water by allowing HCl and water vapour to flow from heat exchanger (8) to vertical heat exchanger (9), allowing them to condense in vertical heat exchanger (9) and collecting in tank (10).

Traces of HCl and water which was carried to re-boiler (11) along with hydrobromic acid were further removed from hydrobromic acid by maintaining temperature of re-boiler (11) at 65-70° C., thereby allowing HCl and water to evaporate and flow to heat exchanger (14) and subsequently to vertical heat exchanger (15), allowing HCl and water vapour to condense in vertical heat exchanger (15), and collecting them in the storage tank (16).

HBr mist which was carried away to heat exchanger (14) was allowed to condense in the heat exchanger (14) and was fed back to re-boiler (11).

What is claimed is:

1. A continuous process for manufacturing hydrobromic acid by separating hydrobromic acid from sulfuric acid and subsequently concentrating the hydrobromic acid, comprising:
   (i) filling a flash tank and a first re-boiler with a mixture of hydrobromic acid and sulfuric acid from a feed tank;
   (ii) heating the mixture of hydrobromic acid and sulfuric acid to 95-100° C. under reduced pressure by heating the first re-boiler so as to cause thermo-siphoning of said mixture from the first re-boiler to the flash tank;
   (iii) continuously adding the mixture of the hydrobromic acid and sulfuric acid from the feed tank to the flash tank, maintaining the temperature at 95-100° C.;
   (iv) condensing an azeotropic mixture of hydrobromic acid and water formed during step (iii) in a first heat exchanger and feeding it back to a hollow column which is fitted above the flash tank;
   (v) allowing hydrobromic acid from the azeotropic mixture of hydrobromic acid and water to drop into a reflux divider, which is fitted in the hollow column in step (iv);
   (vi) allowing hydrobromic acid to flow through a connecting pipe from the reflux divider to a second re-boiler, said second re-boiler maintained at 65-70° C.;
   (vii) allowing hydrobromic acid to flow from the bottom of the second re-boiler to a first storage tank via a second heat exchanger; and
   (viii) collecting sulfuric acid from the bottom of the flash tank into a second storage tank via a third heat exchanger by opening a valve when specific gravity of sulfuric acid is at least 1.45.

2. The continuous process for manufacturing hydrobromic acid as described in claim 1, wherein incidentally produced HCl and water are removed from a mixture containing hydrobromic acid, HCl and water by allowing HCl and water vapor to flow from the first heat exchanger to a first vertical heat exchanger, allowing them to condense in the first vertical heat exchanger and collecting in the third storage tank.

3. A continuous process for manufacturing hydrobromic acid as described in claim 1, wherein traces of HCl and water, which get carried to a second re-boiler along with the hydrobromic acid, are further removed from the hydrobromic acid by maintaining temperature of the second re-boiler at 65-70° C., thereby allowing HCl and water to evaporate and flow to the third heat exchanger and subsequently to the second vertical heat exchanger, allowing HCl and water vapor to condense in the second vertical heat exchanger, and collecting them in a storage tank.

4. The continuous process for manufacturing hydrobromic acid as described in claim 1, wherein HBr mist which gets carried away to the third heat exchanger is allowed to condense in the third heat exchanger and is fed back to the second re-boiler.

5. The continuous process for manufacturing hydrobromic acid as described in claim 1, wherein the mixture of hydrobromic acid and sulfuric acid is prepared by treatment of bittern with chlorine to generate bromine which is reacted in situ with SO2 and water to produce a mixture of hydrobromic acid and sulfuric acid.

6. The continuous process for manufacturing hydrobromic acid as described in claim 5, wherein incidentally produced HCl and water are removed from a mixture containing hydrobromic acid, HCl and water by allowing HCl and water vapor to flow from the first heat exchanger to a first vertical heat exchanger, allowing them to condense in the first vertical heat exchanger and collecting in the third storage tank.

7. A continuous process for manufacturing hydrobromic acid as described in claim 5, wherein traces of HCl and water, which get carried to a second re-boiler along with the hydrobromic acid, are further removed from the hydrobromic acid by maintaining temperature of the second re-boiler at 65-70° C., thereby allowing HCl and water to evaporate and flow to the third heat exchanger and subsequently to the second vertical heat exchanger, allowing HCl and water vapor to condense in the second vertical heat exchanger, and collecting them in a storage tank.

8. The continuous process for manufacturing hydrobromic acid as described in claim 5, wherein HBr mist which gets carried away to the third heat exchanger is allowed to condense in the third heat exchanger and is fed back to the second re-boiler.

* * * * *